United States Patent
Tsukada et al.

(10) Patent No.: US 10,218,032 B2
(45) Date of Patent: Feb. 26, 2019

(54) LI-ION CONDUCTIVE OXIDE CERAMIC MATERIAL INCLUDING GARNET-TYPE OR SIMILAR CRYSTAL STRUCTURE

(71) Applicant: TDK CORPORATION, Tokyo (JP)

(72) Inventors: Takeo Tsukada, Tokyo (JP); Teiichi Tanaka, Tokyo (JP); Hirofumi Kakuta, Tokyo (JP); Taisuke Masuko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 184 days.

(21) Appl. No.: 15/063,989

(22) Filed: Mar. 8, 2016

(65) Prior Publication Data

US 2016/0268630 A1  Sep. 15, 2016

(30) Foreign Application Priority Data

Mar. 10, 2015 (JP) ................ 2015-047174
Feb. 3, 2016 (JP) ................ 2016-018896

(51) Int. Cl.
*H01M 10/0562* (2010.01)
*H01M 10/0525* (2010.01)
*H01M 10/0585* (2010.01)

(52) U.S. Cl.
CPC ... *H01M 10/0562* (2013.01); *H01M 10/0525* (2013.01); *H01M 10/0585* (2013.01); *H01M 2300/0077* (2013.01)

(58) Field of Classification Search
None
See application file for complete search history.

(56) References Cited

U.S. PATENT DOCUMENTS

| | | | | |
|---|---|---|---|---|
| 2013/0230778 A1* | 9/2013 | Saimen | ............... | H01M 10/056 429/303 |
| 2014/0295287 A1* | 10/2014 | Eisele | ............... | C01G 25/006 429/319 |
| 2015/0200420 A1* | 7/2015 | Holme | ............... | H01M 10/0525 429/322 |

(Continued)

FOREIGN PATENT DOCUMENTS

JP   2010-202499 A   9/2010

OTHER PUBLICATIONS

Deviannapoorani et al. "Syntheses of garnet structured Li7+xLa3YxZR2-xO12 (x=0-0.4) by modified sol-gel method," J Sol-Gel Sci Technol (2012) 64:510-514. (Year: 2012).*

(Continued)

*Primary Examiner* — Alix E Eggerding
(74) *Attorney, Agent, or Firm* — Oliff PLC

(57) ABSTRACT

A Li-ion conductive oxide ceramic material including a garnet-type or similar crystal structure according to an aspect of the present disclosure contains Li, La, Zr, and O, the material further containing one or more elements selected from the group consisting of rare-earth elements. A Li-ion conductive oxide ceramic material including a garnet-type or similar crystal structure according to the other aspects of the present disclosure is represented by the following composition formula (1) $Li_{7+x}La_3Zr_{2-x}A_xO_{12}$ where A is one or more elements selected from the group consisting of rare-earth elements, and x is a number such that $0<x\le0.5$.

16 Claims, 1 Drawing Sheet

(56) References Cited

U.S. PATENT DOCUMENTS

2016/0293947 A1* 10/2016 Tamura .................. C01G 23/00

OTHER PUBLICATIONS

Janani et al. "Influence of sintering additives on densification and Li+ conductivity of Al doped Li7La3Zr2O12 lithium garnet" RSC Adv., 2014, 4, 51228. (Year: 2014).*
Miara et al. "First-Principles Studies on Cation Dopants and Electrolyte/Cathode Interphases for Lithium Garnets" Chem. Mater. 2015, 27, 4040-4047. (Year: 2015).*
Thangadurai et al; "Novel Fast Lithium Ion Conduction in Garnet-Type Li5La3M2O12 (M=Nb, Ta);" J. Am. Ceram. Soc.; 2003; vol. 86; No. 3; pp. 437-440.
Murugan et al; "Fast Lithium Ion Conduction in Garnet-Type Li7La3Zr2O12;" Angew. Chem. Int. Ed.; 2007; Col. 46; pp. 7778-7781.
Ramaswamy Murugan et al., "High conductive yttrium doped Li7La3Zr2O12 cubic lithium garnet," Elctrochemistry Communications, vol. 13 (2011), Issue 12, 1373-1375.
Alexander Kuhn et al., "Li Ion Dynamics in Al-Doped Garnet-Type Li7La3Zr2O12 Crystallizing with Cubic Symmetry," Z. Phys. Chem., vol. 226 (2012),Issue 5-6, 525-537.
Deviannapoorani et al., "Synthesis of garnet structured Li7+xLa3Zr2-xO12 (x=0-0.4) by modified sol-gel method," J. of Sol-Gel Sci. Technol., No. 64, Sep. 2012, pp. 510-514.

* cited by examiner

LI-ION CONDUCTIVE OXIDE CERAMIC MATERIAL INCLUDING GARNET-TYPE OR SIMILAR CRYSTAL STRUCTURE

CROSS-REFERENCE TO RELATED APPLICATION

This application claims priority from Japanese Patent Application No. 2015-047174 filed with the Japan Patent Office on Mar. 10, 2015, the entire content of which is hereby incorporated by reference.

The present disclosure relates to Li-ion conductive oxide ceramic materials with a garnet-type or similar crystal structure.

BACKGROUND

All-solid lithium ion secondary batteries with the electrolyte including sintered ceramic material have high thermal stability compared s pith lithium secondary batteries in which nonaqueous electrolyte is used. However, an ail-solid lithium ion secondary battery having high capacity has yet to be put to practical use anywhere in the world. One of the reasons lies in the solid electrolyte itself. Three examples of the major characteristics required of solid electrolyte are high ion conductivity (electrical conductivity), high chemical stability, and a wide potential window. Among others, the garnet-type oxide ceramic material satisfies the high chemical stability and potential window requirements, and is therefore considered one of the most promising candidates for solid electrolyte (see, for example, J. Am. Ceram. Soc,. 2003, 86 (3), pp. 437-440, and Angew. Chem. Int. Ed., 2007, 46, 7778-7781).

SUMMARY

A Li-ion conductive oxide ceramic material including a garnet-type or similar crystal structure contains Li, La, Zr, and O, the material further containing one or more elements selected from the group consisting of rare-earth elements.

Figure 1:
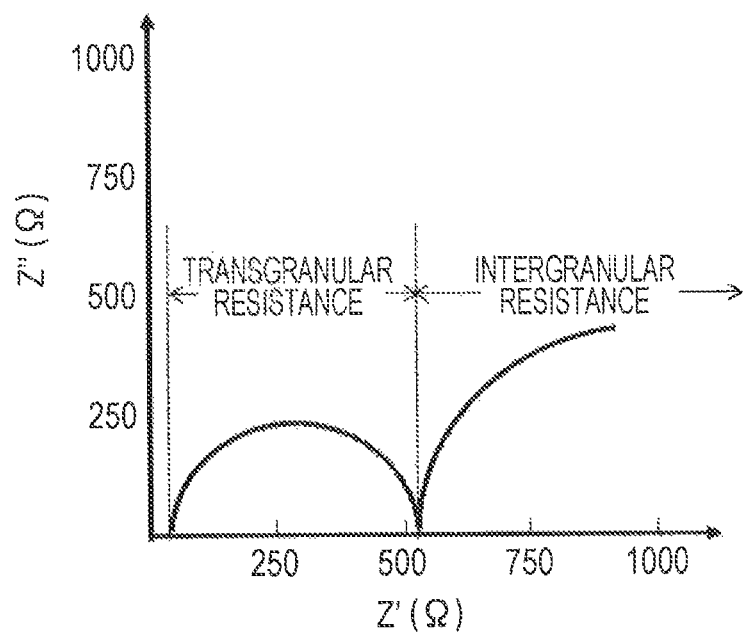
FIG. 1 shows a Nyquist plot obtained by an experiment.

DETAILED DESCRIPTION OF THE EMBODIMENTS in the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Regarding the garnet-type oxide ceramic material, a further increase in ion conductive characteristics is desirable. Generally, the ion conductivity of ion conductive ceramic can be considered in terms of conductivity contributed by a resistance component in grain and conductivity contributed by an intergranular resistance component. In solid electrolyte ceramic, when used in a sufficiently thick shape, a large number of intergranular portions are present. Accordingly, in order to evaluate the ion conductivity of the electrolyte as a whole, the contribution by both the transgranular and intergranular resistance components is considered. However, in a device including thin solid electrolyte layers having large crystal particles, the number of grain boundaries is relatively decreased, possibly resulting in a reduced contribution of intergranular resistance component. As a result, the conductivity of the ion conductor per se due only to transgranular resistance becomes important.

In Japanese Patent No. 5083336, for example, the ion conductivity is calculated and evaluated from the combined resistance of transgranular resistance and intergranular resistance. However, in this literature, there is no description of evaluation of ion conductivity due only to transgranular resistance.

An object of the present disclosure is to provide a Li-ion conductive oxide ceramic material with a garnet-type or similar crystal structure described below. In the Li-ion conductive oxide ceramic material, compared with Li-ion conductive oxide ceramic material with a typical garnet-type or similar crystal structure, the resistance component in grain is decreased so that the transgranular ion conductivity is high. In this way, the total ion conductivity in the ceramic material with the decreased number of grain boundaries is increased.

Herein, the garnet-type crystal structure is defined as a structure having 1a-3d as a space group. Further, a similar crystal structure to the garnet-type crystal structure is defined as a structure (crystal group) having $14_1/acd$ as a space group.

The present inventors conducted researches to achieve the object and have discovered that an increase in the ion conductivity contributed by resistance component in grain can be achieved by having a rare-earth element included in a Li-ion conductive oxide ceramic material with a garnet-type or similar crystal structure.

That is, a Li-ion conductive oxide ceramic material including a garnet-type or similar crystal structure according to an aspect of the present disclosure contains Li, La, Zr, and O, the material further containing one or more elements selected from the group consisting of rare-earth elements.

A Li-ion conductive oxide ceramic material including a garnet-type or similar crystal structure according to the other aspects of the present disclosure is represented by the following composition formula (1):

$$Li_{7+x}La_3Zr_{2-x}A_xO_{12} \quad (1)$$

where A is one or more elements selected from the group consisting of rare-earth elements, and x is a number such that $0<x\leq 0.5$.

It is believed that the effect of increased mobility of Li ion can be obtained by substituting the Zr site by a rare-earth element, whereby the lattice constant is increased and the movable space of the Li ion is expanded.

A in the composition formula (1) may be one or more elements selected from the group consisting of Gd, Tb, Dy, Ho, Er, Tm, Yb, and Lu.

It is believed that by substituting the Zr site by Gd, Tb, Dy, Ho, Er, Tm, Yb, or Lu, an optimum space for the movement of Li ions is formed, whereby the effect of high ion conductivity can be obtained.

A in the composition formula (1) may be one or more elements selected from the group consisting of Gd, Ho, and Yb, where x may be a number such that $0<x\leq 0.30$.

In this way, an optimum space for the concerted movement of Li ions can be achieved, whereby the effect of even higher ion conductivity can be obtained.

The Li-ion conductive oxide ceramic material including the garnet-type or similar crystal structure may further contain Al, The content of Al may be not lower than 0.3 wt % and not higher than 2.0 wt % with respect to a total weight of the Li-ion conductive oxide ceramic material.

It is believed that by having Al contained in the Li-ion conductive oxide ceramic material, formation of a cubic crystal of $Li_{7+x}La_3Zr_{2-x}A_xO_{12}$ is facilitated, whereby the effect of higher ion conductivity can be obtained.

In the Li-ion conductive oxide ceramic material including the garnet-type or similar crystal structure according to the various aspects of the present disclosure, compared with the typical Li-ion conductive oxide ceramic material including the garnet-type or similar crystal structure, the ion conductivity contributed by the resistance component in grain is increased. In this way, there can be provided the Li-ion conductive oxide ceramic material including the garnet-type or similar crystal structure with high overall ion conductivity in a ceramic material with a relatively small number of grain boundaries.

The garnet-type Li-ion conductive oxide according to the various aspects of the present disclosure can be expected to he preferably applied in devices having a thin solid electrolyte layer, particularly a stacked secondary battery including a number of thin layers.

In the following, a preferred embodiment of the present disclosure will he described with reference to the drawings. The technology according to the present disclosure is not limited to the following embodiment. The constituent elements described below may include other constituent elements that may readily occur to those skilled in the relevant art, or constituent elements substantially identical to the described constituent elements. Further, the constituent elements described below may be used in combination as needed.

The Li-ion conductive oxide ceramic material with the garnet-type or similar crystal structure according to the present embodiment includes a Li-ion conductive oxide ceramic material containing Li, La, Zr, and O and including the garnet-type or similar crystal structure, and further includes one or more elements selected from the group consisting of rare-earth elements.

The Li-ion conductive oxide ceramic material according to the present embodiment is expressed by, for example, composition formula (1); namely, $Li_{7+x}La_3Zr_{2-x}A_xO_{12}$ (1). In formula (1), A is one or more elements selected from the group consisting of rare-earth elements, and x is a number such that $0<x\leq0.5$, where x may be a number such that $0<x\leq0.3$.

The Li-ion conductive oxide ceramic material of the present embodiment includes a Li-ion conductive oxide ceramic material containing Li, La, Zr, and O and including the garnet-type or similar crystal structure, and further contains a rare-earth element. In this case, the site substituted by the rare-earth element is not limited to Zr site and may be the site of other metal ions. Preferably, however, the site substituted by the rare-earth element is Zr site.

The Li-ion conductive oxide ceramic material having the garnet-type or similar crystal structure according to the present embodiment may be identified by powder X-ray diffraction, for example. It goes without saying that it is only necessary to identify $Li_xLa_3Zr_2O_{12}$, or the so-called LLZ, and that the LLZ is not necessary required to have the stoichiometric composition. Namely, the LLZ may have deficiency, such as oxygen deficiency.

The rare-earth element included (added) in the Li-ion conductive oxide ceramic material having the garnet-type or similar crystal structure is quantitated by, for example, high-frequency inductively coupled plasma (ICP) optical emission spectroscopy performed on a powder of the Li-ion conductive oxide ceramic material.

The Li-ion conductive oxide ceramic material having the garnet-type or similar crystal structure according to the present embodiment is a material represented by the chemical formula $Li_{7+x}La_3Zr_{2-x}A_xO_{12}$, where a part of Zr is believed to be substituted by one or more elements selected from the group consisting of rare-earth elements that have greater ion radii than that of Zr and are trivalent elements.

It is known that the Zr site of a Li-ion conductive oxide with the garnet-type or similar crystal structure is six-coordinated, and the rare-earth elements are also six-coordinated. In this case, the ion radii of the rare-earth elements are greater than the ion radius of Zr. As the Zr site is substituted by the rare-earth elements with the greater ion radii, the lattice constant is increased. As a result, it is believed that the movable space of the Li ion is expanded, making it easier for the Li ion to move.

The reason for substituting the Zr site is as follows. When the Zr site (tetravalent site) is substituted by the trivalent ion, the Li site in $Li_{7+x}La_3Zr_{2-x}A_xO_{12}$ becomes excessive due to charge compensation. Accordingly, the amount of movable Li ion increases. In the Li-ion conductive oxide ceramic material according to the present embodiment, the lattice constant and the amount of Li ion of the oxide represented by the chemical formula $Li_{7+x}La_3Zr_{2-x}A_xO_{12}$ can be controlled by the above mechanism, whereby, it is believed, the ion conductivity in the crystal grains can be increased.

Preferably, the Zr site is substituted by one or more rare-earth elements selected from the group consisting of Gd, Tb, Dy, Ho, Er, Tm, Yb, and Lu. The inventors consider that this is for the following reason. When the Zr site is substituted by a rare-earth element having a greater ion radius than that of the Zr site, the space in which Li ion can move expands, making it easier for Li ion to move. With regard to the space in which Li ion move, there is a space with the optimum extent allowing the Li ions to readily move. If the movable space is extended too much by the substitution of the Zr site by a rare-earth element with a greater ion radius, it would become difficult to achieve a concerted movement of the Li ions. Accordingly, it is believed that by substituting the Zr site by one or more rare-earth elements selected from the group consisting of Gd, Tb, Dy, Ho, Er, Tm, Yb, and Lu, an optimum-extent space enabling easy movement of the Li ions can be formed, whereby even higher ion conductivity can be obtained.

In the composition formula (1), x may be such that $0<x\leq0.30$. In this way, higher ion conductivity may be obtained.

The Zr site may be substituted by one or more rare-earth elements selected from the group consisting of Gd, Ho, and Yb. In this way, the optimum space for the concerted movement of Li ions can be achieved, whereby higher ion conductivity can be obtained.

The Li-ion conductive oxide ceramic material including the garnet-type or similar crystal structure according to the present embodiment may contain Al. The content Al may he 0.3 wt % or more 2.0 wt % or less with respect to the total weight of the Li-ion conductive oxide ceramic inaterial. In this way, high ion conductivity can be obtained. The reason is believed to be that this configuration facilitates the formation of $Li_{7+x}La_3Zr_{2-x}A_xO_{12}$ having a cubic system crystal structure. If the content of Al is less than 0.3 wt %, the effect of facilitating the formation of the cubic structure may become weakened. If the content of Al is more than 2.0 wt %, there is a possibility that the firing may be hindered. Consequently, sintering density may be decreased, resulting in a decrease in ion conductivity.

Method for Manufacturing Ceramic Material

The Li-ion conductive oxide ceramic material according to the present embodiment can be obtained by firing a mixed raw material obtained by mixing the Li compound, the La compound, the Zr compound, and a compound of one or more rare-earth elements selected from the group consisting of rare-earth elements. At this time, sintering may be promoted by adding a sintering auxiliary agent containing an Al compound to the mixed raw material before firing, whereby densified Li-ion conductive ceramic material can be obtained.

Examples of the Li compound include LiOH or a hydrate thereof, $Li_2CO_3$, $LiNO_3$, and $CH_3COOLi$. Examples of the La compound include $La_2O_3$, $La(OH)_3$, $La_2(CO_3)_3$, $La(NO_3)_3$, and $(CH_3COO)_3La$. Examples of the Zr compound include $Zr_2O_2$, $ZrO(NO_3)_2$, $ZrO(CH_3COO)_2$, $Zr(OH)_2 CO_3$, and $ZrO_2$.

Examples of the rare-earth compound include $A_2O_3$, $A_2(CO_3)_3$, $A(NO_3)_3$, and $(CH_3COO)_3A$ (A is a rare-earth element).

Examples of the Al compound include $Al_3O_3$, $Al(OH)_3$, and $Al(NO_3)_3$.

An example of the method for manufacturing the garnet-type Li-ion conductive oxide ceramic according to the present embodiment will be described. The oxide manufacturing method includes (a) a raw material mixing step, (b) a calcining step, and (c) a final molding and main sintering step. The steps will be described in order in the following.

(a) Raw Material Mixing Step

In the raw material mixing step, starting materials including the respective elements of formula (1), namely $Li_{7+x}La_3Zr_{2-x}A_xO_{12}$ are weighed to achieve the stoichiometric ratio of formula (1) and mixed. The starting materials may include a carbonate, a sulfate, a nitrate, an oxalate, a chloride, a hydroxide, an oxide, and the like of the respective elements. Among others, using a carbonate that generates carbon dioxide gas by thermal decomposition and a hydroxide that produces water vapor by thermal decomposition may make gas treatment relatively easy. For example, a carbonate of Li, a hydroxide of La, a hydroxide of A, and an oxide of Zr may be used.

The mixing method may include dry method whereby the raw materials are mixed and pulverized without being put into solvent. Alternatively, the raw materials may be put into solvent and then mixed and pulverized by wet method. By the wet method whereby the raw materials are put into solvent and then mixed and pulverized, improved mixing property may be obtained. The raw material mixing method may employ a planetary mill, an attritor, a ball mill, or the like. As the solvent, a solvent that does not readily dissolve Li may be used. For example, an organic solvent such as ethanol may be used. The mixing time may be 1 to 32 hours, depending on the mixing amount.

(b) Calcining Step

In the calcining step, the mixed powder obtained in the mixing step is calcined. The calcination temperature may be not lower than the temperature at which a state change occurs in the starting material (such as the development of gas or a phase change) and lower than the temperature at the time of the main sintering. For example, when $Li_2CO_3$ is used as one of the starting materials, the calcination temperature may be not lower than the temperature at which the carbonate is decomposed and lower than the temperature at the time of the main sintering. In this way, during the subsequent main sintering, a density decrease due to the development of gas by thermal decomposition can be suppressed. Specifically, the calcination temperature may be 800° C. to 1000° C.

(c) Molding and the Main Sintering Step

In the main sintering, after the material obtained in the calcining step ("a pre-main sintering powder") is molded, sintering is performed at the calcination temperature or above. Examples of the method for obtaining a molding include a method whereby a binder is added to the pre-main sintering powder and then molding is performed using a metal mold; a cold isostatic pressing (CIP); hot isostatic pressing (FHP); and hot pressing. By these methods, a molding with a desired shape can be obtained. Additionally, the pre-sintering powder may be mixed with an organic binder, a dispersant, and a plasticizer or the like to obtain a sheet molding. Further, using the sheet molding, a structural member having a plurality of layers may be fabricated. The sintering atmosphere may be an atmospheric air, or a reducing atmosphere as needed.

According to the above-described fabrication method, after the mixed powder of the starting materials is mixed, calcination is performed at a relatively low temperature and then the main sintering is performed. Accordingly, a composition error can be accurately suppressed. It should be noted, however, that the method for fabricating the Li-ion conductive oxide ceramic material including the garnet-type or similar crystal structure according to the present embodiment is not limited to the above method and may include other fabrication methods.

All-solid Lithium Ion Secondary Battery

Figure 2:
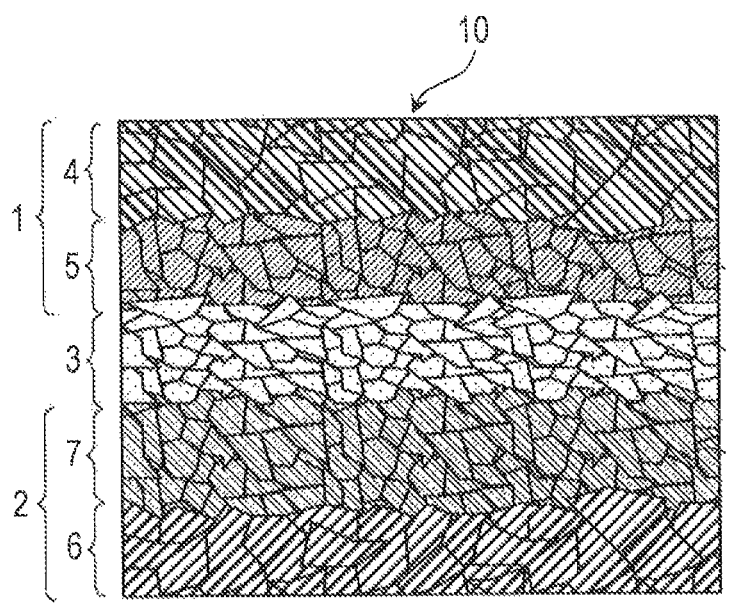
FIG. 2 is a cross sectional view illustrating a conceptual structure of a lithium ion secondary battery.

As depicted in FIG. 2, an all-solid lithium ion secondary battery 10 according to the present embodiment includes a positive electrode layer 1, a negative electrode layer 2, and a solid electrolyte layer 3. The solid electrolyte layer 3 includes the Li-ion conductive oxide ceramic material of the present embodiment. The Li-ion conductive oxide ceramic material according to the present embodiment includes, in addition to the Li-ion conductive oxide ceramic material containing Li, La, Zr, and O and including the garnet-type or similar crystal structure, one or more elements selected from the group consisting of rare-earth elements.

The Li-ion conductive oxide ceramic material according to the present embodiment is represented by the following formula (1), for example:

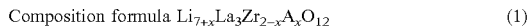

$$\text{Composition formula } Li_{7+x}La_3Zr_{2-x}A_xO_{12} \tag{1}$$

where A is one or more elements selected from the group consisting of rare-earth elements, and x is a number such that $0<x\leq0.5$. The all-solid lithium ion secondary battery 10 having the configuration provides a highly practical secondary battery compared with typical products.

The positive electrode layer 1 of the all-solid Li-ion secondary battery 10 according to the present embodiment includes a positive electrode active material layer 5 and a positive electrode current collector layer 4. The negative electrode layer 2 includes a negative electrode active material layer 7 and a negative electrode current collector layer 6.

The materials of the positive electrode active material layer 5 and the negative electrode active material layer 7 may include known positive electrode active material and negative electrode active material used in conventional lithium secondary batteries, and may be manufactured by a method well known in the relevant art.

Positive Electrode Active Material

The material for the positive electrode active material layer 5 is not particularly limited, and positive electrode active materials typically used in known all-solid batteries may be used. Specific examples of the positive electrode active material include manganese dioxide ($MnO_2$), iron oxide, copper oxide, nickel oxide, lithium-manganese composite oxide (such as $LiMn_2O_4$ and $Li_xLMnO_2$), lithium-nickel composite oxide (such as $Li_xNiO_2$), lithium-cobalt composite oxide (such as $Li_xCoO_2$), lithium-nickel-cobalt composite oxide (such as $LiNi_{1-y}Co_yO_2$), lithium-manganese-cobalt composite oxide (such as $LiMn_yCo_{1-y}O_2$), spinel-type lithium-manganese-nickel composite oxide (such as $Li_xMn_{2-y}Ni_yO_4$), lithium phosphate compound having olivine structure (such as $Li_xFePO_4$, $Li_xFe_{1-y}Mn_yPO_4$, $Li_xCoPO_4$, and $LiVOPO_4$), lithium phosphate compound having the NASICON structure (such as $Li_xV_2(PO_4)_3$, $Li_2VOP_2O_7$, $LA_2VP_2O_7$, $Li_4(VO)(PO_4)_2$, and $Li_9V_3(P_2O_7)_3(PO_4)_2$), iron sulfate ($Fe_2(SO_4)_3$), and vanadium oxide (such as $V_2O_5$). Each of the examples may be used individually or two or more of the examples may be used in combination. In the above chemical formulas, x and y may be in the ranges of $1<x<5$ and $0<y<1$. Preferably, the positive electrode active material may be $LiCoO_2$, $LiNiO_2$, $Li_xV_2(PO_4)_5$, or $LiFePO_4$ among others.

Negative Electrode Active Material

The material of the negative electrode active material layer 7 is not particularly limited, and negative electrode active materials typically used in known all-solid batteries may be used. Specific examples of the negative electrode active material include carbon, metal lithium (Li), metal compound, metal oxide, Li metal compound, Li metal oxide (including lithium-transition metal composite oxide), boron-added carbon, graphite, and compound having the NASICON structure. Each of the above examples may be used individually, or two or more of the examples may be used in combination. For example, when metal lithium (Li) is used as the negative electrode active material, the capacity of the ail-solid battery can be increased. The carbon may include typically known carbon material, such as graphite carbon, hard carbon, and soft carbon. Examples of the metal compound include LiAl, LiZn, $Li_3Bi$, $Li_3Sd$, $Li_4Si$, $Li_{4.4}Sn$, and $Li_{0.17}C(LiC_6)$. Examples of the metal oxide include SnO, $SnO_2$, GeO, $GeO_2$, $In_2O$, $In_2O_3$, $Ag_2O$, AgO, $Ag_2O_3$, $Sb_2O_3$, $Sb_2O_4$, $Sb_2O_5$, SiO, ZnO, CoO, NiO, $TiO_2$, and FeO. Examples of the Li metal compound include $Li_3FeN_2$, $Li_{2.6}Co_{0.4}N$, and $Li_{2.6}Cu_{3.4}N$. An example of the Li metal oxide (lithium-transition metal composite oxide) is a lithium-titanium composite oxide represented by $Li_4Ti_5O_{12}$. Examples of the boron-added carbon include boron-added carbon and boron-added graphite.

Current Collector

The material of the current collector (the positive electrode current collector layer 4 or the negative electrode current collector layer 6) of the all-solid type lithium-ion secondary battery 10 according to the present embodiment may be a material having large conductivity. Examples of the material are silver, palladium, gold, platinum, aluminum, copper, and nickel. Particularly, copper is preferable because it does not readily react with lithium aluminum titanium phosphate and, further, copper is effective in decreasing the internal resistance of the lithium-ion secondary battery. The materials of the positive electrode and the negative electrode included in the current collector may be the same or different from each other.

The positive electrode current collector layer 4 and the negative electrode current collector layer 6 of the lithium-ion secondary battery 10 according to the present embodiment may include a positive electrode active material and a negative electrode active material, respectively.

When the positive electrode current collector layer 4 and the negative electrode current collector layer 6 include a positive electrode active material and a negative electrode active material, respectively, adhesion is increased between the positive electrode current collector layer 4 and the positive electrode active material layer 5, and between the negative electrode current collector layer 6 and the negative electrode active material layer 7.

Method for Manufacturing Lithium Ion Secondary Battery

For manufacturing the lithium ion secondary battery 10 according to this embodiment, first, each material of the positive electrode current collector layer 4, the positive electrode active material layer 5, the solid electrolyte layer 3, the negative electrode active material layer 7, and the negative electrode current collector layer 6, which has been made into a paste, is prepared. Next, these materials are coated and dried, whereby green sheets are manufactured. The obtained green sheets are stacked to manufacture a stacked body, and by firing the stacked body at the same time, the lithium ion secondary battery 10 is manufactured.

A method of making the material into a paste is not limited in particular. For example, the paste can be obtained by mixing the powder of each material in vehicle. Here, the vehicle is a collective term for the medium in a liquid phase. The vehicle includes the solvent and the binder. By this method, the pastes for the positive electrode current collector layer 4, the positive electrode active material layer 5, the solid electrolyte layer 3, the negative electrode active material layer 7, and the negative electrode current collector layer 6 are prepared.

The prepared paste is coated on a base material such as PET in the desired order. Next, the paste on the base material is dried as necessary and then the base material is removed; thus, the green sheet is manufactured. The method of coating the paste is not particularly limited. Any of known methods including the screen printing, the coating, the transcription, and the doctor blade can be used.

A desired number of green sheets can be stacked in the desired order. If necessary, alignment, cutting and the like can be performed to manufacture a stacking block. In the case of manufacturing a parallel type or serial-parallel type battery, the alignment may be conducted when the green sheets are stacked, so that the end face of the positive electrode layer I does not coincide with the end face of the negative electrode layer 2.

In order to manufacture the stacked body, the active material unit to be described below may he prepared and the stacking block may be manufactured.

First, the paste for the solid electrolyte layer 3 is formed into a sheet shape on a PET film by the doctor blade method. After the paste for the positive electrode active material layer 5 is printed on the obtained sheet for the solid electrolyte layer 3 by the screen printing, the printed paste is dried. Next, the paste for the positive electrode current collector layer 4 is printed thereon by the screen printing, and then the printed paste is dried. Furthermore, the paste for the positive electrode active material layer 5 is printed again thereon by the screen printing, and the printed paste is dried. Next, by removing the PET film, the positive electrode active material layer unit is obtained, in this manner, the positive electrode active material layer unit in which the paste for the positive electrode active material layer 5, the paste for the positive electrode current collector layer 4, and the paste for the positive electrode active material layer are formed in this order on the sheet for the solid electrolyte layer 3 is obtained. In the similar procedure, the negative electrode active material layer unit is also manufactured. The negative electrode active material layer unit in which the paste for the negative electrode active material layer 7, the paste for the negative electrode current collector layer 6, and the paste for the negative electrode active material layer 7 are formed in this order on the sheet for the solid electrolyte layer 3 is obtained.

One sheet of the positive electrode active material layer unit and one sheet of the negative electrode active material layer unit are stacked via the sheet for the solid electrolyte layer 3. At this time, the units may be staggered such that the paste for the positive electrode current collector layer 4 of the first sheet of the positive electrode active material layer unit extends only over one end face, with the paste for the negative electrode current collector layer 6 of the second sheet of the negative electrode active material layer unit extending only over the other end face. On both sides of the units thus stacked, sheets for the solid electrolyte layer 3 of a predetermined thickness are further stacked, fabricating a stacked block.

The manufactured stacking block is crimped at the same time. The crimping is performed while heat is applied. The heating temperature is, for example, 40° C. to 95° C.

The crimped stacking block is fired by being heated at 600° C. to 1200° C. under the nitrogen atmosphere. The firing time is, for example, 0.1 to 3 hours. Through this firing, the stacked body is completed.

EXAMPLES

The contents of the present embodiment will be described more specifically with reference to examples and comparative examples. The present disclosure, however, is not limited to the following examples.

Example 1 to Example 10

In order to verify the effects according to the present embodiment. Examples 1 to 10 of the Li-ion conductive oxide ceramic material including the garnet-type or similar crystal structure were prepared. Examples 1 to 5 were prepared by substituting the Zr site of $Li_{7.10}La_{3.00}(Zr_{1.90}A_{0.10})O_{12}$ by Y, Nd, Gd, Ho, or Yb as A. Examples 6 to 10 were prepared by adding 1.0 wt % of $Al_2O_3$ to Examples 1 to 5, respectively. As the starting materials, $Li_2CO_3$, $La(OH)_3$, $ZrO_2$, $Y_2O_3$, $Nd_2O_3$, $Gd_2O_3$, $Ho_2O_3$, $Yb_2O_3$, and $Al_2O_3$ were used.

Initially, the starting materials were weighed to achieve the stoichiometric ratio. The weighed starting materials were mixed and pulverized in ethanol using a ball mill (120 rpm/zirconia balls) for 16 hours. The mixed powder of the starting materials was separated from the balls and ethanol, arid thereafter calcined in an alumina crucible at 900° C. for 5 hours in an atmospheric air. Thereafter, the calcined powder was processed in ethanol using the ball mill (120 rpm/zirconia balls) for 16 hours for mixing. The pulverized powder was separated from the balls and ethanol and then dried. In this way, the pre-main sintering powder was obtained. To the pre-main sintering powder, an organic binder was added to prepare a granule. The granule was molded in disc shape using a metal mold with diameter of 10 mm at 7 kN. The molding was subjected to main sintering on a platinum plate at the sintering temperature of 1100° C. to 1150° C. for 2 hours in the atmosphere. In this way, a disc-shaped sinter sample was obtained.

Example 11 to Example 26

Examples 11 to 18 were prepared by substituting the Zr of $Li_{7.35}La_{3.00}(Zr_{1.65}A_{0.35})O_{12}$ respectively by Gd, Tb, Dy, Ho, Er, Tm, Yb, or Lu as A. Further, Examples 19 to 26 were prepared by adding 1.0 wt % of $Al_2O_3$ to Examples 11 to 18, respectively. As the starting materials, $Li_2CO_3$, $La(OH)_3$, $ZrO_2$, $Gd_2O_3$, $Tb_2O_3$, $Dy_2O_3$, $Ho_2O_3$, $Er_2O_3$, $Tm_2O_3$, $Yb_2O_3$, $Lu_2O_3$, and $Al_2O_3$ were used.

Initially, the starting materials were weighed to achieve the stoichiometric ratio. The weighed starting materials were mixed and pulverized in ethanol using a ball mill (120 rpm/zirconia balls) for 16 hours. The mixed powder of the starting materials was separated from the balls and ethanol, and thereafter calcined in an alumina crucible at 900° C. for 5 hours in an atmospheric air. Thereafter, the calcined powder was processed in ethanol using the ball mill (12C rpm/zirconia balls) for 16 hours for mixing. The pulverized powder was separated from the balls and ethanol and then dried. In this way, the pre-main sintering powder was obtained. To the pre-main sintering powder, an organic binder was added to prepare a granule. The granule was molded in disc shape using a metal mold with diameter of 10 mm at 7 kN. The molding was subjected to main sintering on a platinum plate at the sintering temperature of 1075° C. to 1125° C. for 2 hours in the atmosphere. In this way, a disc-shaped sinter sample was obtained.

Example 27 to Example 29

Examples 27 to 29 were prepared by adding 1.0 wt % of $Al_2O_3$ to $Li_{7.05}La_{3.00}(Zr_{1.95}Gd_{0.05})O_{12}$, $Li_{7.25}La_{3.00}(Zr_{1.75}Gd_{0.25})O_{12}$, and $Li_{7.50}La_{3.00}(Zr_{1.50}Gd_{0.50})O_{12}$, respectively. As the starting materials, $Li_2CO_3$, $La(OH)_3$, $ZrO_2$, $Gd_2O_3$, and $Al_2O_3$ were used.

Initially, the starting materials were weighed to achieve the stoichiometric ratio. The weighed starting materials were mixed and pulverized in ethanol using a ball mill (120 rpm/zirconia balls) for 16 hours. The mixed powder of the starting materials was separated from the balls and ethanol, and thereafter calcined in an alumina crucible at 900° C. for 5 hours in an atmospheric air. Thereafter, the calcined powder was processed in ethanol using the ball mill (120 rpm/zireonia balls) for 16 hours for mixing. The pulverized powder was separated from the balls and ethanol and then dried. In this way, the pre-main sintering powder was obtained. To the pre-main sintering powder, an organic binder was added to prepare a granule. The granule was molded in disc shape using a metal mold with diameter of 10 mm at 7 kN. The molding was subjected to main sintering on a platinum plate at the sintering temperature of 1100° C. to 1125° C. for 2 hours in the atmosphere. In this way, a disc-shaped sinter sample was obtained.

Example 30 to Example 32

Examples 30 to 32 were prepared by adding 1.0 wt % of $Al_2O_3$ to $Li_{7.05}La_{3.00}(Zr_{1.95}Ho_{0.05})O_{12}$, $Li_{7.25}La_{3.00}(Zr_{1.75}Ho_{0.25})O_{12}$, and $Li_{7.50}La_{3.00}(Zr_{1.50}Ho_{0.50})O_{12}$, respectively. As the starting materials, $Li_2CO_3$, $La(OH)_3$, $ZrO_2$, $Ho_2O_3$, and $Al_2O_3$ were used.

Initially, the starting materials were weighed to achieve the stoichiometric ratio. The weighed starting materials were mixed and pulverized in ethanol using a ball mill (120 rpm/zirconia balls) for 16 hours. The mixed powder of the starting materials was separated from the balls and ethanol, and thereafter calcined in an alumina crucible at 900° C. for 5 hours in an atmospheric air. Thereafter, the calcined powder was processed in ethanol using the ball mill (120 rpm/zirconia balls) for 16 hours for mixing. The pulverized powder was separated from the halls and ethanol and then dried. In this way, the pre-main sintering powder was obtained. To the pre-main sintering powder, an organic binder was added to prepare a granule. The granule was molded in disc shape using a metal mold with diameter of 10 mm at 7 kN. The molding was subjected to main sintering on a platinum plate at the sintering temperature of 1050° C. to 1125° C. for 2 hours in the atmosphere. In this way, a disc-shaped sinter sample was obtained.

Example 33 to Example 35

Examples 33 to 35 were prepared by adding 1.0 wt % of $Al_2O_3$ to $Li_{7.05}La_{3.00}(Zr_{1.95}Yb_{0.05})O_{12}$, $Li_{7.25}La_{3.00}(Zr_{1.75}Yb_{0.25})O_{12}$, and $Li_{7.50}La_{3.00}(Zr_{1.50}Yb_{0.50})O_{12}$, respectively. As the starting materials, $Li_2CO_3$, $La(OH)_3$, $ZrO_2$, $Yb_2O_3$, and $Al_2O_3$ were used.

Initially, the starting materials were weighed to achieve the stoichiometric ratio. The weighed starting materials were mixed and pulverized in ethanol using a ball mill (120 rpm/zirconia balls) for 16 hours. The mixed powder of the starting materials was separated from the balls and ethanol, and thereafter calcined in an alumina crucible at 900° C. for 5 hours in an atmospheric air. Thereafter, the calcined powder was processed in ethanol using the ball mill (120 rpm/zirconia balls) for 16 hours for mixing. The pulverized powder was separated from the balls and ethanol and then dried. In this way, the pre-main sintering powder was obtained. To the pre-main sintering powder, an organic binder was added to prepare a granule. The granule was molded in disc shape using a metal mold with diameter of 10 mm at 7 kN. The molding was subjected to main sintering on a platinum plate at the sintering temperature of 1050° C. to 1100° C. for 2 hours in the atmosphere. In this way, a disc-shaped sinter sample was obtained.

Example 36 to Example 41

Examples 36 to 41 were obtained by adding $Al_2O_3$ to $Li_{7.35}La_{3.00}(Zr_{1.65}Yb_{0.35})O_{12}$ so that the $Al_2O_3$ content (wt %) became 0.2 wt %, 0.3 wt %, 0.7 wt %, 1.5 wt %, 2.0 wt %. and 2.1 wt %, respectively. As the starting materials, $Li_2CO_3$, $La(OH)_3$, $Yb_2O_3$, and $Al_2O_3$ were used.

Initially, the starting materials were weighed to achieve the stoichiometric ratio. The weighed starting materials were mixed and pulverized in ethanol using a ball mill (120 rprnizireonia balls) for 16 hours. The mixed powder of the starting materials was separated from the balls and ethanol, and thereafter calcined in an alumina crucible at 900° C. for 5 hours in an atmospheric air. Thereafter, the calcined powder was processed in ethanol using the ball mill (120 rpm/zirconia balls) for 16 hours for mixing. The pulverized powder was separated from the balls and ethanol and then dried. In this way, the pre-main sintering powder was obtained. To the pre-main sintering powder, an organic binder was added to prepare a granule. The granule was molded in disc shape using a metal mold with diameter of 10 mm at 7 kN. The molding was subjected to main sintering on a platinum plate at the sintering temperature of 1100° C. to 1150° C. for 2 hours in the atmosphere. In this way, a disc-shaped sinter sample was obtained.

Comparative Example 1

Comparative Example 1 represented by $Li_{7.00}La_{3.00}Zr_{2.00}O_{12}$ was prepared. As the starting materials, $Li_2CO_3$, $La(OH)_3$, and $ZrO_2$ were used.

Initially, the starting materials were weighed to achieve the stoichiometric ratio. The weighed starting materials were mixed and pulverized in ethanol using a ball mill (120 rpm/zirconia balls) for 16 hours. The mixed powder of the starting materials was separated from the balls and ethanol, and thereafter calcined in an alumina crucible at 900° C. for 5 hours in an atmospheric air. Thereafter, the calcined powder was processed in ethanol using the ball mill (120 rpm/zireonia balls) for 16 hours for mixing. The pulverized powder was separated from the balls and ethanol and then dried. In this way, the pre-main sintering powder was obtained. To the pre-main sintering powder, an organic binder was added to prepare a granule. The granule was molded in disc shape using a metal mold with diameter of 10 mm at 7 kN. The molding was subjected to main sintering on a platinum plate at the sintering temperature of 1150° C. for 2 hours in the atmosphere. In this way, a disc-shaped sinter sample was obtained.

Comparative Example 2

Comparative Example 1 was prepared by adding 1.0 wt % of $Al_2O_3$ to $Li_{7.00}La_{3.00}Zr_{2.00}O_{12}$. As the starting materials, $Li_2CO_3$, $La(OH)_3$, $ZrO_2$, and $Al_2O_3$ were used.

Initially, the starting materials were weighed to achieve the stoichiometric ratio. The weighed starting materials were mixed and pulverized in ethanol using a ball mill (120 rpm/zirconia balls) for 16 hours. The mixed powder of the starting materials was separated from the balls and ethanol, and thereafter calcined in an alumina crucible at 900° C. for 5 hours in an atmospheric air. Thereafter, the calcined powder was processed in ethanol using the ball mill (120 rpm/zirconia balls) for 16 hours for mixing. The pulverized powder was separated from the balls and ethanol and then dried. In this way, the pre-main sintering powder was obtained. To the pre-main sintering powder, an organic binder was added to prepare a granule. The granule was molded in disc shape using a metal mold with diameter of 10 mm at 7 kN. The molding was subjected to main sintering on a platinum plate at the sintering temperature of 1100° C. for 2 hours in the atmosphere. In this way, a disc-shaped sinter sample was obtained.

Comparative Example 3

Comparative Example 3 was prepared by adding 1.0 wt % of $Al_2O_3$ to $Li_{7.53}La_{3.00}(Zr_{1.67}Gd_{0.53})O_{12}$. As the starting materials, $Li_2CO_3$, $La(OH)_3$, $ZrO_2$, $Gd_2O_3$, and $Al_2O_3$ were used.

Initially, the starting materials were weighed to achieve the stoichiometric ratio. The weighed starting materials were mixed and pulverized in ethanol using a ball mill (120 rpm/zirconia balls) for 16 hours. The mixed powder of the starting materials was separated from the balls and ethanol, and thereafter calcined in an alumina crucible at 900° C. for 5 hours in an atmospheric air. Thereafter, the calcined powder was processed in ethanol using the ball mill (120 rpm/zirconia balls) for 16 hours for mixing. The pulverized powder was separated from the balls and ethanol and then dried. In this way, the pre-main sintering powder was obtained. To the pre-main sintering powder, an organic binder was added to prepare a granule. The granule was molded in disc shape using a metal mold with diameter of 10 mm at 7 kN. The molding was subjected to main sintering on a platinum plate at the sintering temperature of 1050° C. for 2 hours in the atmosphere. In this way, a disc-shaped sinter sample was obtained.

Comparative Example 4

Comparative Example 4 was prepared by adding 1.0 wt % of $Al_2O_3$ to $Li_{7.52}La_{3.00}(Zr_{1.68}Ho_{0.52})O_{12}$. As the starting materials, $Li_2CO_3$, $La(OH)_3$, $ZrO_2$, $Ho_2O_3$, and $Al_2O_3$ were used.

Initially, the starting materials were weighed to achieve the stoichiometric ratio. The weighed starting materials were mixed and pulverized in ethanol using a ball mill (120 rpm/zirconia balls) for 16 hours. The mixed powder of the starting materials was separated from the balls and ethanol, and thereafter calcined in an alumina crucible at 900° C. for 5 hours in an atmospheric air. Thereafter, the calcined powder was processed in ethanol using the ball mill (120 rpm(zirconia balls) for 16 hours for mixing. The pulverized powder was separated from the balls and ethanol and then dried. In this way, the pre-main sintering powder was obtained. To the pre-main sintering powder, an organic binder was added to prepare a granule. The granule was molded in disc shape using a metal mold with diameter of 10 mm at 7 kN. The molding was subjected to main sintering on a platinum plate at the sintering temperature of 1050° C. for 2 hours in the atmosphere. In this way, a disc-shaped sinter sample was obtained.

Comparative Example 5

Comparative Example 4 was prepared by adding 1.0 wt % of $Al_2O_3$ to $Li_{7.52}La_{3.00}(Zr_{1.68}Ho_{0.52})O_{12}$. As the starting materials, $Li_2CO_3$, $La(OH)_3$, $ZrO_2$, $Yb_2O_3$, and $Al_2O_3$ were used.

Initially, the starting materials were weighed to achieve the stoichiometric ratio. The weighed starting materials were mixed and pulverized in ethanol using a ball mill (120 rpm/zirconia balls) for 16 hours. The mixed powder of the starting materials was separated from the balls and ethanol, and thereafter calcined in an alumina crucible at 900° C. for 5 hours in an atmospheric air. Thereafter, the calcined powder was processed in ethanol using the ball mill (120 rpm/zirconia balls) for 16 hours for mixing. The pulverized powder was separated from the halls and ethanol and then dried. In this way, the pre-main sintering powder was obtained. To the pre-main sintering powder, an organic binder was added to prepare a granule. The granule was molded in disc shape using a metal mold with diameter of 10 mm at 7 kN. The molding was subjected to main sintering on a platinum plate at the sintering temperature of 1050° C. for 2 hours in the atmosphere. In this way, a disc-shaped sinter sample was obtained.

Calculation of Relative Density

The sintering density of the Li-ion conductive oxide ceramic forming the disc-shaped sintered material was calculated as follows. First, the volume of the disc-shaped sintered material was measured using a micrometer. Then, the sintering density of the disc-shaped sintered material was calculated by dividing the dry weight of the disc-shaped sintered material by the volume. The sintering density was divided by the theoretical density, obtaining the relative density in percentage (%). The relative density of the examples and the comparative examples are shown in Tables 1 to 8 as will he described below.

Measurement of Conductivity and Estimation of Ion Conductivity

Impedance and phase angle were measured using an AC impedance analyzer (Type 1260 manufactured by Solartron) in a constant temperature bath at the measurement temperature of 25° C., the measurement frequency of 0.05 Hz to 30 MHz, and the amplitude voltage of 50 mV. Based on the measurement values, a Nyquist plot was drawn, and a resistance value was determined based on the arc thereof. From the resistance value, conductivity was calculated. During the measurement with the AC impedance analyzer, an Au electrode was used as a blocking electrode. The Au electrode had a circular shape with diameter of 3 mm and was formed by sputtering.

From the measurement, a Nyquist plot shown in FIG. 1 was obtained. The resistance value obtained from the Nyquist plot can be considered in terms of a resistance in the crystal and a resistance including intergranular resistance, depending on the type of the arc. According to the present embodiment, the ion conductivity calculated on the basis of the resistance in the crystal is shown in Tables 1 to 6.

TABLE 1

| | A | Firing temperature (° C.) | Relative density (%) | Ion conductivity in crystal grain (S/cm) |
|---|---|---|---|---|
| Example 1 | Y | 1150 | 86.5 | 1.13E−03 |
| Example 2 | Nd | 1150 | 91.8 | 1.31E−03 |
| Example 3 | Gd | 1150 | 89.5 | 1.42E−03 |
| Example 4 | Ho | 1150 | 94.4 | 1.42E−03 |
| Example 5 | Yb | 1125 | 93.4 | 1.43E−03 |
| Comparative Example 1 | None | 1150 | 77.5 | 1.90E−04 |

In the samples obtained in Examples 1 to 5, the Zr site was substituted by a rare-earth element with a greater ion radius. As a result, the Li ion movable space was expanded, and the Li ion concentration was also increased. Specifically, it has been confirmed that these samples exhibited high ion conductivities of not less than $1.00 \times 10^{-3}$ S/cm. In contrast, in the sample obtained in Comparative Example 1, the Zr site had not been substituted by a rare-earth element, and it was confirmed that the sample obtained in Comparative Example 1 exhibited a low ion conductivity of $7.90 \times 10^{-4}$ S/cm.

TABLE 2

| (Al contained) | | | | |
|---|---|---|---|---|
| | A | Firing temperature (° C.) | Relative density (%) | Ion conductivity in crystal grain (S/cm) |
| Example 6 | Y | 1125 | 88.3 | 1.18E−03 |
| Example 7 | Nd | 1125 | 93.7 | 1.36E−03 |
| Example 8 | Gd | 1125 | 91.3 | 1.48E−03 |
| Example 9 | Ho | 1125 | 96.3 | 1.48E−03 |
| Example 10 | Yb | 1100 | 95.3 | 1.49E−03 |
| Comparative Example 2 | None | 1100 | 79.1 | 8.23E−04 |

In Examples 6 to 10, the Zr site was substituted by a rare-earth element, and additionally Al was contained. In this way, formation of a cubic crystal was facilitated, and it was confirmed that in Examples 6 to 10, even higher ion conductivity was obtained. Specifically, high ion conductivities of not lower than $1.18 \times 10^{-3}$ S/cm were observed. On the other hand, in Comparative Example 2, although Al was also contained, the Zr site was not substituted by a rare-earth element. It was confirmed that Comparative Example 2 exhibited a low ion conductivity of $8.23 \times 10^{-4}$ S/cm.

TABLE 3

| | A | Firing temperature (° C.) | Relative density (%) | Ion conductivity in crystal grain (S/cm) |
|---|---|---|---|---|
| Example 11 | Gd | 1125 | 89.9 | 3.93E−03 |
| Example 12 | Tb | 1125 | 90.5 | 3.42E−03 |
| Example 13 | Dy | 1125 | 89.2 | 3.31E−03 |
| Example 14 | Ho | 1125 | 94.8 | 4.02E−03 |
| Example 15 | Er | 1100 | 92.1 | 3.01E−03 |
| Example 16 | Tm | 1100 | 91.1 | 2.87E−03 |
| Example 17 | Yb | 1100 | 93.9 | 4.03E−03 |
| Example 18 | Lu | 1100 | 89.8 | 2.81E−03 |

In Examples 11 to 18, particularly the Zr site was substituted by, any of Cd, Tb, Dy, Ho, Er, Tm, Yb, and Lu among rare-earth elements, and additionally, the amount of substitution was increased. Accordingly, in Examples 11 to 18, the Li ion movable space had been even more optimized, and it was confirmed that the examples exhibit high ion conductivities of not lower than $2.81 \times 10^{-3}$ S/cm.

TABLE 4

(Al contained)

| | A | Firing temperature (° C.) | Relative density (%) | Ion conductivity in crystal grain (S/cm) |
|---|---|---|---|---|
| Example 19 | Gd | 1100 | 81.8 | 4.10E−03 |
| Example 20 | Tb | 1100 | 92.4 | 3.57E−03 |
| Example 21 | Dy | 1100 | 91.0 | 3.45E−03 |
| Example 22 | Ho | 1075 | 96.8 | 4.18E−03 |
| Example 23 | Er | 1075 | 93.9 | 3.13E−03 |
| Example 24 | Tm | 1075 | 92.9 | 2.99E−03 |
| Example 25 | Yb | 1075 | 95.8 | 4.20E−03 |
| Example 26 | Lu | 1075 | 91.6 | 2.93E−03 |

In Examples 19 to 26, Al is additionally contained. In this way, formation of a cubic crystal is facilitated. Accordingly, it was confirmed that in Examples 19 to 26, high ion conductivity was obtained. Specifically, high ion conductivities of not lower than $2.93 \times 10^{-3}$ S/cm were observed.

TABLE 5

(Gd and Al contained)

| | x | Firing temperature (° C.) | Relative density (%) | Ion conductivity in crystal grain (S/cm) |
|---|---|---|---|---|
| Comparative Example 2 | 0 | 1100 | 79.1 | 8.23E−04 |
| Example 27 | 0.05 | 1125 | 82.1 | 9.52E−04 |
| Example 8 | 0.10 | 1125 | 91.3 | 1.48E−03 |
| Example 28 | 0.25 | 1125 | 89.6 | 3.44E−03 |
| Example 19 | 0.35 | 1100 | 81.8 | 4.10E−03 |
| Example 29 | 0.50 | 1100 | 87.4 | 1.44E−03 |
| Comparative Example 3 | 0.53 | 1050 | 87.2 | 3.48E−04 |

TABLE 6

(Ho and Al contained)

| | x | Firing temperature (° C.) | Relative density (%) | Ion conductivity in crystal grain (S/cm) |
|---|---|---|---|---|
| Comparative Example 2 | 0 | 1100 | 79.1 | 8.23E−04 |
| Example 30 | 0.05 | 1125 | 88.4 | 9.92E−04 |
| Example 9 | 0.10 | 1125 | 96.3 | 1.48E−03 |
| Example 31 | 0.25 | 1075 | 96.5 | 3.58E−03 |
| Example 22 | 0.35 | 1075 | 96.8 | 4.18E−03 |
| Example 32 | 0.50 | 1050 | 94.1 | 1.50E−03 |
| Comparative Example 4 | 0.52 | 1050 | 93.9 | 3.63E−04 |

TABLE 7

(Yb and Al contained)

| | x | Firing temperature (° C.) | Relative density (%) | Ion conductivity in crystal grain (S/cm) |
|---|---|---|---|---|
| Comparative Example 2 | 0 | 1100 | 79.1 | 8.23E−04 |
| Example 33 | 0.05 | 1100 | 87.5 | 9.95E−04 |
| Example 10 | 0.10 | 1100 | 95.3 | 1.49E−03 |
| Example 34 | 0.25 | 1075 | 95.6 | 3.69E−03 |
| Example 25 | 0.35 | 1075 | 96.8 | 4.20E−03 |
| Example 35 | 0.50 | 1050 | 93.1 | 1.60E−03 |
| Comparative Example 5 | 0.52 | 1050 | 92.9 | 3.64E−04 |

The effect of the amount of substitution on the transgranular ion conductivity was verified by changing the substitution amount of Gd, Ho, and Yb as representative examples of the elements by which to substitute the Zr site. As shown in Examples 8, 9, and 10 and Examples 27 to 35, it was verified that high ion conductivities of not lower than $9.50 \times 10^{-4}$ S/cm were exhibited when the amount of substitution x was in the range of from 0.05 to 0.50. Particularly, the samples obtained in Examples 8, 9, 10, 28, 29, 31, 32, 34, and 35 (where the amount of substitution x was 0.10 to 0.50) exhibited high ion conductivities of not lower than $1.45 \times 10^{-3}$ S/cm, On the other hand, in Comparative Example (x=0), the ion conductivity was low at $8.23 \times 10^{-4}$ S/cm. Further, the ion conductivity also decreased in Comparative Examples 3, 4, and 5 where the amount of substitution x was 0.52 or 0.53. Specifically, Comparative Examples 3, 4, and 5 exhibited the low ion conductivities of $3.48 \times 10^{-4}$ S/cm, $3.63 \times 10^{-4}$ S/cm, and $3.64 \times 10^{-4}$ S/cm, respectively.

TABLE 8

(Yb and Al contained)

| | Al2O3: y (wt %) | Firing temperature (° C.) | Relative density (%) | Ion conductivity in crystal grain (S/cm) |
|---|---|---|---|---|
| Example 36 | 0.2 | 1100 | 88.8 | 9.97E−04 |
| Example 37 | 0.3 | 1100 | 96.0 | 3.33E−03 |
| Example 38 | 0.7 | 1100 | 96.1 | 5.10E−03 |
| Example 25 | 1.0 | 1100 | 95.8 | 4.20E−03 |
| Example 39 | 1.5 | 1125 | 93.5 | 3.35E−03 |

TABLE 8-continued (Yb and Al contained)

| | Al2O3: y (wt %) | Firing temperature (° C.) | Relative density (%) | Ion conductivity in crystal grain (S/cm) |
|---|---|---|---|---|
| Example 40 | 2.0 | 1125 | 90.3 | 9.91E−04 |
| Example 41 | 2.1 | 1150 | 75.6 | 9.65E−04 |

The effect of having Al contained to increase sintering property and stabilize formation of a cubic crystal was verified. In Examples 37 to 40, the content of Al was in the range of from 0.3 wt % to 2.0 wt %. In these examples, high ion conductivities of not lower than $9.90 \times 10^{-4}$ S/cm were exhibited. Particularly, in the samples obtained in Examples 32 to 34 (the amount of substitution 0.3 wt % to 1.5 wt %), high ion conductivities of not lower than $3.33 \times 10^{-3}$ S/cm were exhibited. In contrast, it was confirmed that Example 36 with a small Al content of 0.2 wt % and Example 41 with a large Al content of 2.1 wt % respectively exhibited ion conductivities of $9.97 \times 10^{-4}$ S/cm and $9.65 \times 10^{-4}$ S/cm, which are lower than those of the examples in which the Al content was 0.3 wt % to 2.0 wt %, Confirmation of the Produced Phase With respect to the samples of the examples, phase identification was performed based on an XRD measurement result. As a result, it was confirmed that the samples of the examples had a substantially single phase. Accordingly, it was determined that the Zr site had been substituted by a rare-earth element used for substitution. For the measurement, the X'Pert PRO XRD measuring device from PANalytical was used, The sample powder was measured under the conditions of CuKα, 2θ:10 to 90°, 0.01° step/sec.

Composition Analysis

With respect to each of the samples of the examples, the chemical composition was analyzed by ICP optical emission spectrometry (using the ICP-7500 measuring device from Shimadzu Corporation). As a result, it was confirmed that there was no change between the evaluated sample composition and the feed composition.

Example 42

In the following, examples of the all-solid lithium secondary battery will be described. However, the present disclosure is not limited to the examples. In the following description, "parts" indicates "parts by mass" unless otherwise noted. Preparation of positive electrode active material and negative electrode active material As the positive electrode active material and the negative electrode active material, $Li_3V_2(PO_4)_3$ prepared by the method below was used. First, $Li_2CO_3$, $V_2O_5$, and $NH_4H_2PO_4$ as the starting material were wet mixed for 16 hours using a ball mill. The powder obtained after dehydration and drying was calcined for two hours at 850° C. In a nitrogen-hydrogen mix gas. The calcined product was pulverized by wet method and then dehydrated and dried, whereby the positive electrode active material powder and the negative electrode active material powder were obtained. It has been confirmed that the prepared powder had a constituent of $Li_3V_2(PO_4)_3$ according to the Xray diffraction apparatus.

Preparation of Paste for Positive Electrode Active Material Layer and Paste for Negative Electrode Active Material Layer The paste for the positive electrode active material layer and the paste for the negative electrode active material layer were prepared as below. In other words, 15 parts of ethyl cellulose as the hinder and 65 parts of dihydroterpineol as the solvent were added to 100 parts of powder of $Li_3V_2(PO_4)_3$ to be mixed. Thus, the powder is dispersed in the solvent, whereby the paste for the positive electrode active material layer and the paste for the negative electrode active material layer were obtained.

Preparation of Solid Electrolyte

As the solid electrolyte, a compound of $Li_{7.35}La_{3.00}(Zr_{1.65}Yb_{0.35})O_{12}$ to which 1.0 wt % of $Al_2O_3$ was added was used. The compound was prepared by the following method. As the starting materials, $Li_2CO_3$, $La(OH)_3$, $ZrO_2$, $Yb_2O_3$, and $Al_2O_3$ were used. The starting materials were mixed and pulverized using a ball mill (120 rpm/zirconia balls) for 16 hours. The mixed powder of the starting materials was separated from the balls and ethanol, and then calcined in an alumina crucible at 900° C. for 5 hours in an atmospheric air, obtaining a calcined powder. Thereafter, the calcined powder was processed in ethanol using the ball mill (120 rpm/zirconia balls) for 16 hours for mixing. In this way, a pulverized powder was obtained. The pulverized powder was separated from the balls and ethanol and then dried. In this way, a powder of the present solid electrolyte was obtained. The structure of the prepared powder was confirmed to be $Li_{73.5}La_{3.00}(Zr_{1.65}Yb_{0.35})O_{12}$ by means of an X-ray diffraction device.

Next, this powder was wet mixed with 100 parts of ethanol and 200 parts of toluene as the solvent in the hall mill. After that, 16 parts of polyvinylbutyral hinder and 4.8 parts of benzylbutylphthalate were further charged therein and mixed, whereby the paste for the solid electrolyte layer was prepared.

Manufacture of Sheet for Solid Electrolyte Layer

By molding a sheet with the paste for the solid electrolyte layer on a PET film as the base material by a doctor blade method, a sheet for a solid electrolyte layer with a thickness of 15 μm was obtained.

Preparation of Paste for Positive Electrode Current Collector Layer and Paste for Negative Electrode Current Collector Layer The powder of Ni and $Li_3V_2(PO_4)_3$ used as the positive electrode current collector and the negative electrode current collector was mixed at a volume ratio of 80/20. After that, ethyl cellulose as the binder and dihydroterpineol as the solvent were added and mixed, whereby the powder was dispersed in the solvent and thus the paste for the positive electrode current collector layer and the paste for the negative electrode current collector layer were obtained. The average particle diameter of Ni was 0.9 μm.

Preparation of Terminal Electrode Paste

By mixing silver powder, epoxy resin, and solvent, the powder was dispersed in the solvent and a thermosetting terminal electrode paste was obtained.

With the use of these pastes, the lithium ion secondary battery was manufactured as below.

Manufacture of Positive Electrode Active Material Layer Unit

The paste for the positive electrode active material layer with a thickness of 5 μm was printed on the sheet for the above described solid electrolyte layer by the screen printing. The printed paste was dried for 10 minutes at 80° C. Next, the paste for the positive electrode current collector layer with a thickness of 5 μm was printed thereon by the screen printing. The printed paste was dried for 10 minutes at 80° C. The paste for the positive electrode active material layer with a thickness of 5 μm was printed again thereon by the screen printing. The printed paste was dried for 10 minutes at 80° C. Next, the PET film was removed. Thus, the sheet of the positive electrode active material layer unit was obtained in which the paste for the positive electrode active material layer, the paste for the positive electrode current collector layer, and the paste for the positive electrode active material layer were printed and dried in this order on the sheet for the solid electrolyte layer.

Manufacture of Negative Electrode Active Material Layer Unit

The paste for the negative electrode active material layer with a thickness of 5 μm was printed on the sheet for the above described solid electrolyte layer by the screen printing. The printed paste was dried for 10 minutes at 80° C., Next, the paste for the negative electrode current collector layer with a thickness of 5 μm was printed thereon by the screen printing. The printed paste was dried for 10 minutes at 80° C., The paste for the negative electrode active material layer with a thickness of 5 μm was printed again thereon by the screen printing. The printed paste was dried for 10 minutes at 80° C. Next, the PET film was removed. Thus, the sheet of the negative electrode active material layer unit was obtained in which the paste for the negative electrode active material layer, the paste for the negative electrode current collector layer, and the paste for the negative electrode active material layer were printed and dried in this order on the sheet for the solid electrolyte layer.

Fabrication of Stacked Body

One sheet of the positive electrode active material layer unit and one sheet of the negative electrode active material layer unit were stacked via a solid electrolyte layer sheet. At this time, the units were staggered such that the paste for the positive electrode current collector layer of the first sheet of the positive electrode active material layer unit extended only over one end face, with the paste for the negative electrode current collector layer of the second sheet of the negative electrode active material layer unit extending only over the other end face. On both sides of the stacked units, solid electrolyte layer sheets were stacked to a thickness of 500 μm. Thereafter, the stack was molded by thermal press-bonding and cut into stacked blocks. The stacked blocks were then simultaneously fired, obtaining stacked bodies. The simultaneous firing was performed by increasing the temperature to a firing temperature of 1075° C. at a temperature increase rate of 200° C./h in nitrogen, and then maintaining the temperature for 2 hours. After the firing, the stacked bodies were naturally cooled.

Step of Forming Terminal Electrode

The terminal electrode paste was coated to the end face of the stacking block. The paste on the end face was thermally cured at 150° C. for 30 minutes, thereby forming a pair of terminal electrodes. Thus, the lithium ion secondary battery was completed.

Battery Evaluation

Leads were attached to the terminal electrodes of the obtained lithium-ion secondary battery, and a charging and discharging test was performed under the following measurement conditions. Specifically, the current at the time of both charging and discharging was 2.0 μA. The cut-off voltages at the time of charging and discharging were 4.0 V and 0 V, respectively. The battery charged and discharged well. With regard to the battery characteristics, in the secondary battery using the solid electrolyte of Comparative Example 1, the discharge capacity was 0.4 μA. On the other hand, the discharge capacity of the all-solid lithium secondary battery according to the example was 2.4 μA. Thus, it was learned that the all-solid lithium secondary batteries according to the example has very good battery characteristics.

The embodiment of the present disclosure may be utilized in all-solid lithium ion secondary batteries, particularly a device with a small conductor layer thickness.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A Li-ion conductive oxide ceramic material including a garnet-type or similar crystal structure represented by the following composition formula (1):

$$Li_{7+x}La_3Zr_{2-x}A_xO_{12} \qquad (1)$$

where
A is one or more elements selected from the group consisting of Nd, Gd, Ho, and Yb, and
x is a number such that 0<x≤0.5.

2. The Li-ion conductive oxide ceramic material including the garnet-type or similar crystal structure according to claim 1, wherein
A in the composition formula (1) is one or more elements selected from the group consisting of Gd, Ho, and Yb.

3. The Li-ion conductive oxide ceramic material including the garnet-type or similar crystal structure according to claim 1, wherein
A in the composition formula (1) is one or more elements selected from the group consisting of Gd, Ho, and Yb, where x is a number such that 0<x≤0.30.

4. The Li-ion conductive oxide ceramic material including the garnet-type or similar crystal structure according to claim 2, wherein
A in the composition formula (1) is one or more elements selected from the group consisting of Ho and Yb, where x is a number such that 0<x ≤0.30.

5. The Li-ion conductive oxide ceramic material including the garnet-type or similar crystal structure according to claim 1, further comprising Al, wherein
the content of Al is not lower than 0.3 wt % and not higher than 2.0 wt % with respect to a total weight of the Li-ion conductive oxide ceramic material.

6. The Li-ion conductive oxide ceramic material including the garnet-type or similar crystal structure according to claim 2, further comprising Al, wherein
the content of Al is not lower than 0.3 wt % and not higher than 2.0 wt % with respect to a total weight of the Li-ion conductive oxide ceramic material.

7. The Li-ion conductive oxide ceramic material including the garnet-type or similar crystal structure according to claim 3, further comprising Al, wherein
the content of Al is not lower than 0.3 wt % and not higher than 2.0 wt % with respect to a total weight of the Li-ion conductive oxide ceramic material.

8. The Li-ion conductive oxide ceramic material including the garnet-type or similar crystal structure according to claim 4, further comprising Al, wherein
the content of Al is not lower than 0.3 wt % and not higher than 2.0 wt % with respect to a total weight of the Li-ion conductive oxide ceramic material.

9. An all-solid lithium ion secondary battery comprising the Li-ion conductive oxide ceramic material according to claim 1.

10. An all-solid lithium ion secondary battery comprising the Li-ion conductive oxide ceramic material according to claim 2.

11. An all-solid lithium ion secondary battery comprising the Li-ion conductive oxide ceramic material according to claim 3.

12. An all-solid lithium ion secondary battery comprising the Li-ion conductive oxide ceramic material according to claim 4.

13. An all-solid lithium ion secondary battery comprising the Li-ion conductive oxide ceramic material according to claim 5.

14. An all-solid lithium ion secondary battery comprising the Li-ion conductive oxide ceramic material according to claim 6.

15. An all-solid lithium ion secondary battery comprising the Li-ion conductive oxide ceramic material according to claim 7.

16. An all-solid lithium ion secondary battery comprising the Li-ion conductive oxide ceramic material according to claim 8.

* * * * *